United States Patent [19]

McCain et al.

[11] 3,942,841

[45] Mar. 9, 1976

[54] SLURRY HANDLING SYSTEM

[75] Inventors: David L. McCain; Hilbert D. Dahl, both of Ponca City, Okla.

[73] Assignee: Continental Oil Company, Ponca City, Okla.

[22] Filed: Apr. 23, 1974

[21] Appl. No.: 463,325

[52] U.S. Cl. .................................. 302/14; 299/18
[51] Int. Cl.[2] ........................................ B65G 53/30
[58] Field of Search .............................. 302/14–16, 302/11; 299/7–9, 17–19; 37/58

[56] References Cited
UNITED STATES PATENTS

| | | | |
|---|---|---|---|
| 3,260,548 | 7/1966 | Reichl | 299/18 |
| 3,606,476 | 9/1971 | Krueger et al. | 302/14 |
| 3,617,094 | 11/1971 | Kester | 302/14 |
| 3,790,214 | 2/1974 | Kilroy | 302/14 |

Primary Examiner—Evon C. Blunk
Assistant Examiner—Jeffrey V. Nase
Attorney, Agent, or Firm—William J. Miller

[57] ABSTRACT

An underground, improved slurry transportation system consists of a first and second vertical cavity. Both cavities have a vent means to the surface of the earth. Slurry input means from a plurality of mine faces communicates with the upper portion of the first vertical cavity and slurry output means communicates with the lower portion of the first vertical cavity. A pump connected to the slurry outlet forces the slurry from underground through a slurry handling pipe system to a preparation plant located on the surface of the earth.

Water is added to the second vertical cavity by an inlet communicating with the upper portion of the cavity. Water is also provided to the first cavity, and valves are provided to add water to either the first or second cavity upon demand. A decant system is also provided between the first and second cavities to remove any excess water that may accumulate in the first cavity. A slurry level indicator is mounted vertically in the first cavity to measure the levels of slurry concentration in the cavity. A water level indicator is mounted vertically in the second cavity to measure the level of the water. An electronic apparatus from the surface of the earth determines the slurry concentration in the first cavity and the water level in the second cavity and provides apparatus for controlling these levels to a predetermined amount.

3 Claims, 1 Drawing Figure

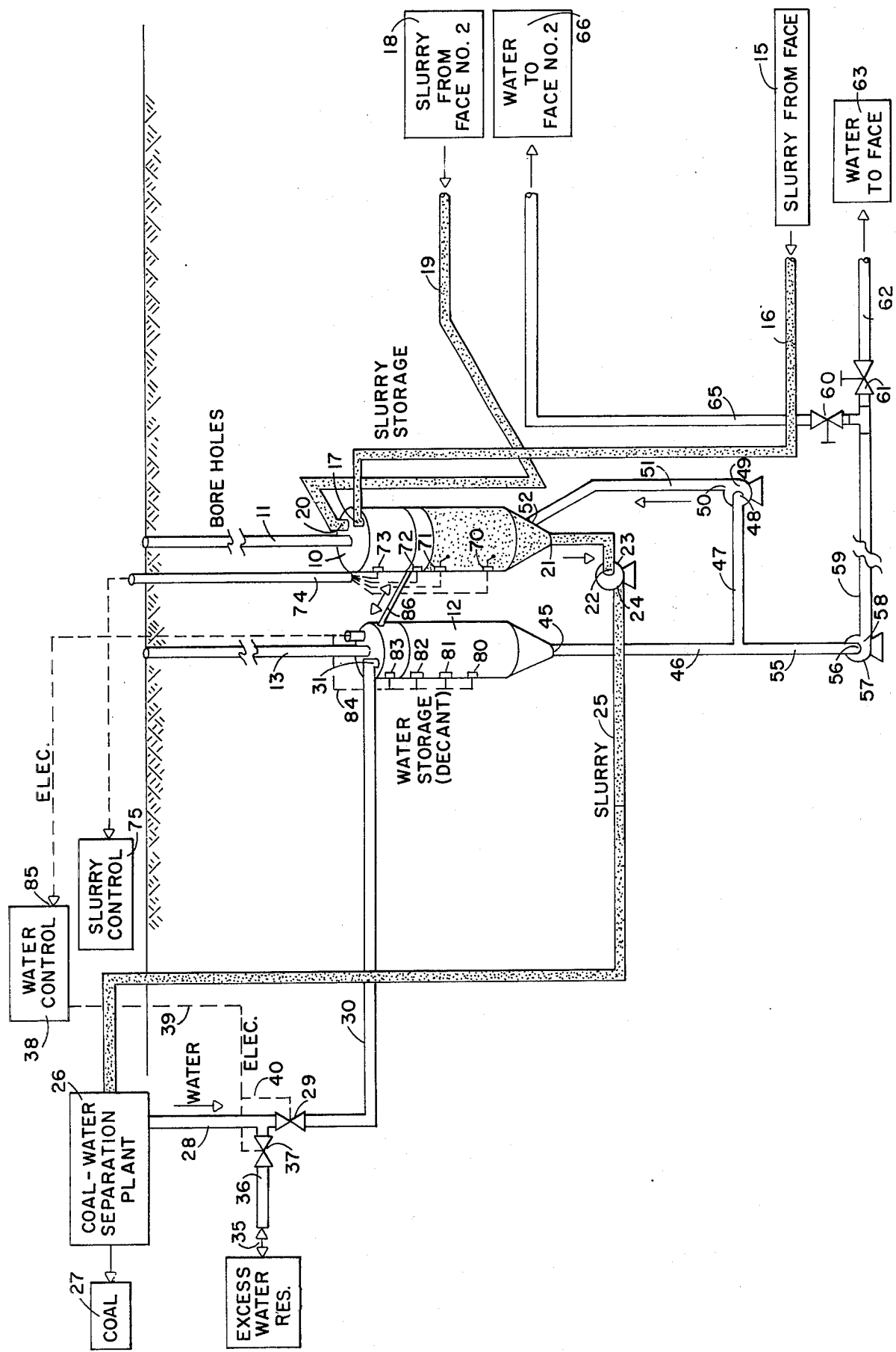

SLURRY HANDLING SYSTEM

BRIEF DESCRIPTION OF THE PRIOR ART

The following patents are pertinent to the invention disclosed herein: U.S. Pat. Nos. 3,512,842 issued to Milewski; 3,606,476 issued to Krueger; 3,612,615 issued to Allen; and 3,269,777 issued to MacLellan. The MacLellan patent discloses a conveyor dumping the product into a hopper which is in direct communication with the formed cavity underground. The cavity comprises a lift for removing the slurry formed in the cavity, a water outlet for disposing of the overflow when material is added, and means for adding water if needed. The patent does not disclose a slurry inlet to an underground cavity. It further does not disclose any means for concentrating the slurry from a plurality of lines and maintaining the concentration by removing the water. Even though water removal is illustrated, the water is also returned to the cavity when the material being dumped into the cavity has been removed.

BRIEF DESCRIPTION OF THE INVENTION

A borehole is drilled from the surface of the earth to a desired depth underground and backreamed to provide a cavity which is sealed and, when outfitted with appropriate input and output channels or pipelines and level control devices, can be used for storage and surge capacity for solids regulation in an underground hydraulic haulage system. The height of the cavity should be dependent upon the system's pump head capabilities and the number and diameter of the cavities upon the required storage capacity, the geometry of the working, and the geology of the area. A sump would be constructed nearby in the underground working to provide a location for excess water, including drainage or leakage and emergency conditions.

BRIEF DESCRIPTION OF THE FIGURE

The FIGURE accompanying this specification illustrates an improved slurry handling system for underground hydraulic haulage.

DETAILED DESCRIPTION OF THE FIGURE

A first vertical cavity means or sump 10 is formed by drilling a borehole 11 and backreaming the borehole to form a sump as illustrated. A second vertical cavity means or sump 12 is likewise formed by drilling a second borehole 13 and backreaming sump 12 in the manner illustrated. A slurry transportation system or hydraulic haulage system from the mine face 15 is transported to a pipe 16 into an inlet 17 of vertical sump 10. A second mine face, for example 18, is communicated through a pipe 19 to a second inlet 20. While two mine faces are illustrated, it is of course obvious that as many mine faces as needed can be utilized depending upon the height and diameter of sump 10. Slurry outlet 21 communicates with a pump inlet 22 of pump 23. A pump outlet 24 is connected through a pipe 25 to the surface of the ground to a coal-water separation plant 26 where the output comprises coal 27 and surplus water through a pipe 28. The surplus water will pass through a controlled valve 29 and pipe 30 to the inlet 31 of sump 12. Additional water can be added to or from a reservoir as illustrated by arrow 35 through a pipe 36 which is controlled by valve 37. A water control system referred to by block 38 has a wire 39 connecting with the valve 37 and a wire 40 connecting with valve 29 so that the valve can be individually operated, as will be explained subsequently. Water from water storage sump 12 can be removed through outlet 45 through pipe 46 and added through pipe 47 through inlet 48 of pump 49 to the outlet 50 of pump 49 and pipe 51 to a fluidizing inlet or jet 52 of vertical sump 10. Water can also be supplied through pipe 55 to the inlet 56 of pump 57 to the outlet 58 of pump 57 to pipe 59 to valves 60 and 61. Valve 61 will permit water to go through pipe 62 to the water inlet 63 of the first mine face. Valve 60 will permit water to go through pipe 65 to the water inlet 66 of face No. 2 for example. Additional valves and inlets for various other mine faces can be provided as needed.

In order to control the concentration of the slurry in sump 10, a plurality of slurry height measuring gauges is mounted vertically in the sump as illustrated by Nos. 70, 71, 72, and 73. Wires 74 communicate the height of the slurry to slurry control apparatus illustrated by block 75. The water storage vertical sump 12 likewise has a plurality of water height indicators illustrated by Nos. 80, 81, 82, and 83, which are coupled to a wire 84 to the inlet 85 of water control system 38. A decant pipe 86 communicates between slurry sump 10 and water sump 12 and permits water to flow or decant from slurry sump 10 to water sump 12.

OPERATION

The system disclosed in the drawing operates as follows. Water is added to sump 12 until it reaches an appropriate level, usually between indicators 82 and 83. Any air in the sump escapes through the borehole 13 which now functions as a vent means. The water may be added from several sources, for example, the water control system 38 through wire 39 can open valves 37 and 29, applying water through pipe 30 into inlet 31 to the sump 12. Water can also be applied from the preparation plant by closing valve 37 and opening 29 so that water can flow from pipe 28 through pipe 30 to inlet 31. Once the water storage sump is full, water is removed to outlet 45 through pipes 46 and 51 to the inlet 56 of pump 57 where it is pressured and supplied to the outlet 58 and pipe 59. If mine face 15 is operating, valve 61 is opened, and water is pumped through pipe 62 to the water inlet of the face 63. There it is added with coal and mixed to form a slurry, where it is pumped through pipe 16 to the inlet 20 of sump 10. Borehole 11 also functions as a vent means to release air to the surface as sump 10 is filled. If the second coal face is operating, water is supplied to valve 60, pipe 65, to water inlet 66 of the second face, where it in turn is likewise mixed with coal to form a slurry and is pumped through pipe 19 to inlet 20 of sump 10. The mixture of coal and water in varying concentrations passes through inlets 17 and 20 and gradually fills sump 10. Since the concentration is more than likely less than 50 percent, the product is permitted to settle and the water decanted through pipe 86 back to water storage sump 12. As the concentration builds up and gradually reaches approximately 50 percent, inlet pump 23 is operated drawing slurry from outlet 21 into inlet 22 where it is pumped to the outlet 24 through pipe 25 to the coal-water separation plant 26. The coal is separated and either piled or moved from the separation plant, and the water is returned through pipe 28 to either the excess water reservoir through pipe 36 in the direction of arrow 35 or, by opening valve 29, is returned through pipe 30 to the inlet 31 of water storage sump 12.

In order to fluidize the sump in the vicinity of the outlet 21, a fluidizing inlet or jet 52 is provided. To operate the fluidizing inlet jet 52, water is drawn from water storage sump 12, outlet 45, through pipes 46 and 47 to the inlet 48 of pump 49 where it is pressurized and supplied to the outlet 50 of pipe 51, which is piped into fluidizing inlet 52 of sump 10. Control of the water height is accomplished by water level sensors 80 through 83. These may be simple flow valves or any other ordinary type water sensing apparatus. The information from these sensors is fed through wire 84 to the water control system 38. If additional water is needed, then water can be supplied either by obtaining water from the coal-water separation plant through pipe 28 to valve 29, which is opened by sending a control signal through wires 39 and 40 from the water control unit 38. The water then passes through pipe 30 to the inlet 31. Water can also be, as previously mentioned, added to the system by opening valves 37 and 29 by utilizing control through wires 39 and 40. Of course, if the water level indicator 82 signals that the water has reached or is above indicator 82, water will be shut off from valve 29. Water may then flow from the water preparation plant 26 down to pipe 28 to valve 37, which can be opened through wire 39 and permit the water to pass through pipe 36 to the excess water reservoir. Water level sensors 72 and 73 will indicate when excess fluids have been pumped into the slurry storage system. This water can be decanted either through pipe 86 to sump 12, or the pump 23 can be operated, removing the slurry water concentration whether it reaches 50 percent or not. It is obvious, of course, that if for some reason the water builds up past water level sensor 73, the system must be deactivated. The above can be accomplished by signaling the various mine faces to shut down the pipes, providing movement of water and slurry from the mine faces down either pipe 16 or 19 to sump 10. The water inlet can be shut off by shutting down the valve 29, and the system can be emptied by operating pump 23. Both sumps 10 and 12 may have a flat or a conically spaced bottom.

CONCLUSIONS

An extremely versatile underground slurry handling system has been disclosed. The system, of course, can be modified by additional slurry sumps or additional water sumps as the need for capacity arises. The sumps can also be made larger in diameter or higher depending upon the additional need for capacity as previously mentioned. While only two slurry pipes have been shown entering slurry sump 10, it is of course obvious that several slurry pipes in addition to the two shown can be added as additional mine faces are being produced. A manway from the surface of the ground or from the mine to and into the various sumps has not been illustrated. Such a manway is obvious and can be formed in one of several ways, either by enlarging the borehole or by forming shafts or tunnels adjacent to the various sumps and providing access to closed doors into the sump. A manway, of course, would be necessary to repair or replace the various sensing elements, such as 72 through 73 or 80 through 83 and for cleaning out the inlets and outlets if they should become plugged or, of course, for adding additional inlets or outlets. It is obvious, of course, that other changes and modifications can be made in the apparatus as described and still fall within the teachings of the specification and appended claims.

What we claim is:

1. An improved slurry handling system under the surface of the earth comprising:
   a. a first vertical cavity means formed under the surface of the earth and having a vent means communicating with said surface;
   b. a second vertical cavity means formed under the surface of said earth and having a second vent means communicating with said surface;
   c. slurry input means communicating with the upper portion of said first vertical cavity;
   d. slurry outlet means communicating with the lower portion of said first vertical cavity;
   e. means connected to said slurry outlet for moving slurry out of said first vertical cavity and to the surface of said earth;
   f. selectively controlled inlet water means communicating with said second vertical cavity;
   g. water outlet means communicating with the lower portion of said second vertical cavity;
   h. decant means communicating between the upper portions of both said first and second vertical cavity means;
   i. slurry level indication means positioned in said first vertical cavity means;
   j. water level indicator means positioned in said first and second vertical cavity means;
   k. means responsive to said water level and said slurry level for maintaining said respective water and slurries at a predetermined level; and
   l. means connected to said water outlet means for reslurrying said slurry at said slurry outlet means.

2. An improved slurry handling system as described in claim 1 wherein said means for reslurrying said slurry at said slurry outlet means comprises a jet mounted adjacent to said outlet means, a pump having its outlet communicating with said jet, and its inlet communicating with a source of water.

3. An improved slurry handling system as described in claim 1 wherein said first vertical cavity comprises an elongated cylinder having a conically shaped bottom.

* * * * *